H. J. GAISMAN

Jan. 14, 1930. SAFETY RAZOR Re. 17,567

2 Sheets-Sheet 1

Original Filed Oct. 6, 1923

INVENTOR
Henry J Gaisman

BY F. Bourne

HIS ATTORNEY

Jan. 14, 1930.

H. J. GAISMAN

SAFETY RAZOR

Re. 17,567

Original Filed Oct. 6, 1923

2 Sheets-Sheet 2

INVENTOR

Henry J. Gaisman

BY

T. R. Bourne

His ATTORNEY

Reissued Jan. 14, 1930 Re. 17,567

UNITED STATES PATENT OFFICE

HENRY J. GAISMAN, OF NEW YORK, N. Y., ASSIGNOR TO AUTO-STROP SAFETY RAZOR CO., INC., OF NEW YORK, N. Y., A CORPORATION OF NEW YORK

SAFETY RAZOR

Original No. 1,658,435, dated February 7, 1928, Serial No. 666,909, filed October 6, 1923. Application for reissue filed November 19, 1929. Serial No. 408,398.

My invention has particular reference to the class of safety razors in which a blade is clamped between a guard and a backing to retain the cutting edge or edges of the blade in shaving relation to the guard teeth. Heretofore, so far as I am aware, in the class of razors above referred to the backing was provided with cylindrical studs spaced apart to enter corresponding apertures in the blade and in the guard plate or member, and a handle attached to said backing clamped the blade between the guard plate or member and the backing. The apertures in the blades for said studs have been considerably larger than the studs, providing ready assembling of the parts whereby the blade has been somewhat loose on the studs, hence the blade has been permitted freedom upon the guard in adjusting the parts.

An object of my invention is to provide new and improved means between the studs of the backing and the apertures in the blade in such a manner that the studs will co-operate with the blade to resist relative movement of the blade with respect to the guard so that the blade will be properly positioned respecting the guard at all times when the parts are clamped together.

A further feature of my invention is that by reason of the arrangement of the apertures in the blade, strain through the center of the blade is relieved when the blade is being clamped between the guard member and the backing member to reduce danger of the blade cracking or splitting in a lengthwise direction while being bent or under tension.

My invention also comprises novel details of improvement that will be more fully hereinafter set forth and then pointed out in the claims.

Reference is to be had to the accompanying drawings forming a part hereof, wherein Figure 1 is a sectional view illustrating the parts of my improved razor assembled;

Similar numerals of reference indicate corresponding parts in the several views.

Figure 1:
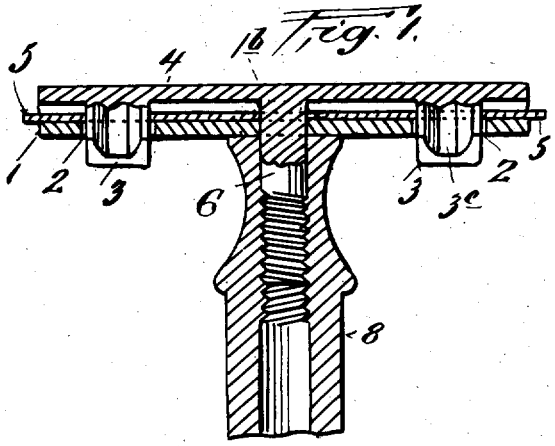
Figure 4:
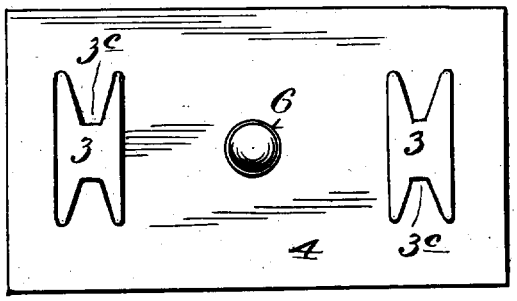
Fig. 4 is an inverted plan view of the backing.
Figure 2:
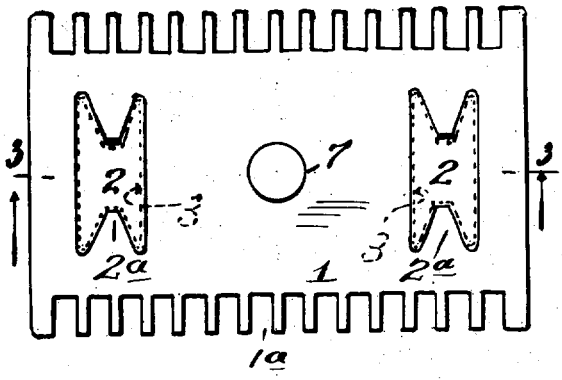
Fig. 2 is a detail plan view of the guard member.
Figure 3:
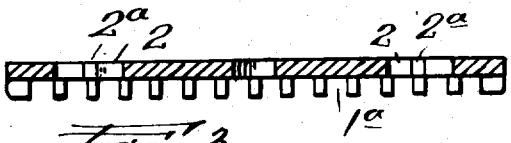
Fig. 3 is a section on line 3, 3, of Fig. 2.

The numeral 1 indicates a guard member provided with suitable guard teeth $1^a$ at its opposite edges and having holes 2 to receive studs 3 extending from backing member or plate 4, the studs also being adapted to pass through apertures in the blade 5 when the latter is in shaving position upon guard member 1. The backing 4 is shown provided with a screw 6 adapted to pass through central hole 5′ in the blade and through hole 7 in guard member 1, to be engaged by a threaded handle 8, whereby the parts may be clamped together for use. As so far described the razor is substantially the same as well known razors.

Figure 5:
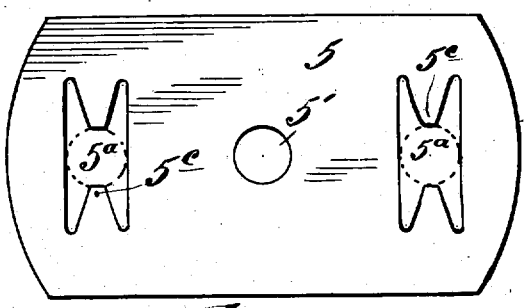
Fig. 5 is a detail of the blade.
Figure 6:
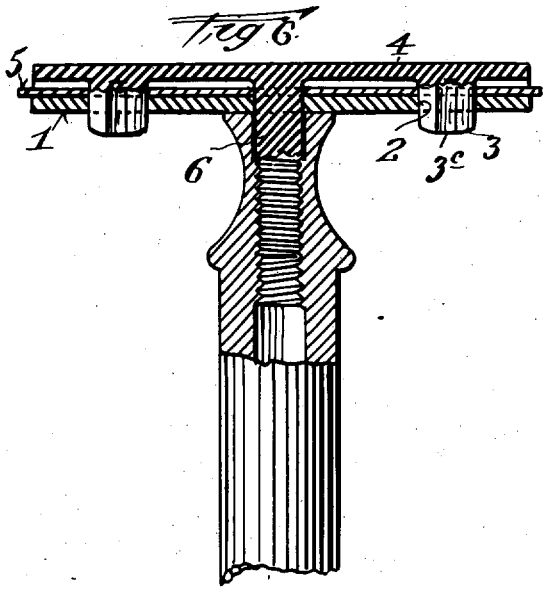
Fig. 6 is a sectional view illustrating a modified form of the razor assembled.
Figure 7:
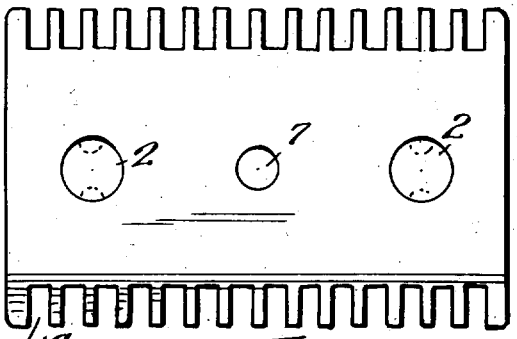
Fig. 7 is a top view of the guard member of Fig. 6.
Figure 8:
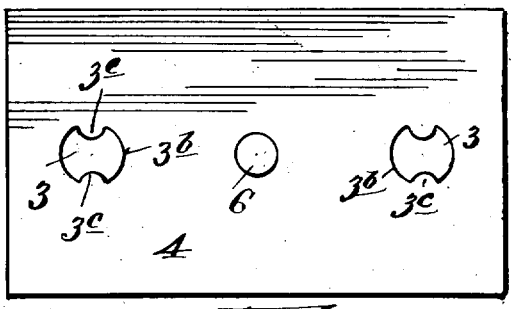
Fig. 8 is an underside view of the backing member of Fig. 6.
Figure 9:
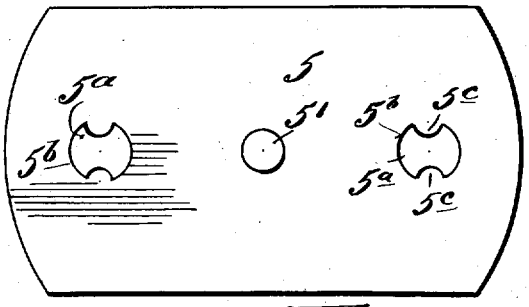
Fig. 9 is a plan view of the blade of Fig. 6.

In accordance with my improvement I provide the studs 3 of such shape as to be noncircular in cross-section and the blade apertures $5^a$ having corresponding contour. In the examples illustrated in Figs. 1 to 5 the studs 3 and blade apertures $5^a$ are shown as substantially rectangular in general contour, while in Figs. 6 to 9 the studs 3 have curved or circularly disposed surfaces at $3^b$ on opposite sides, and the blade apertures $5^a$ have correspondingly curved or circularly disposed opposing edges $5^b$ opposed to the curved surfaces $3^b$ of the studs. The studs 3 and the blade apertures have corresponding complemental offsets shown as projecting and re-entrant portions to co-operate with one another. In Figs. 1, 4, 6 and 8 the studs 3 have longitudinally disposed re-entrant offsets, shown as recesses or grooves $3^c$, that receive corresponding offsets shown as projections $5^c$ in the blade apertures $5^a$, as in Figs. 5 and 9.

The offsets of the studs and blades are complementary to one another and set sufficiently snugly together to retain the blade in proper relation to the studs 3 to secure the blade in required position on the guard member with respect to its teeth. When the parts are assembled and the projections are in the recesses the blade is retained from longitudinal movement along the guard and by engagement of the inner opposing edges of the projections and the corresponding bottoms of the recesses rotation of the blade is prevented so that the blade edges are maintained in proper relation along the guard teeth.

By means of my improvements I obtain the advantage of so relating the several opertures in the blade and giving them such transverse dimensions between the cutting edges of the blade through the interior thereof, that when the blade is bent between the clamping members 1 and 4 danger of breaking or cracking the blade through its longitudinal central portion is relieved.

An advantage of my improved construction is that although the blades and studs described are particularly adapted to operate together for the purpose specified, the spacing between the opposing projections $5^c$ of blade apertures $5^a$ may be such as to receive the studs of backings of the type of Gillette safety razors on the market. Having reference to Fig. 5, it will be noted that, in order to receive the studs of backings of the Gillette type, the blade apertures $5^a$ are so designed that the bounding figure of the transverse cross-section of a cylindrical stud, that is a circle, may be inscribed in the same. The same is true of the blade shown in Fig. 9 of the drawings. Putting it other words, the stud receiving apertures $5^a$ are so designed that the oppositely projecting spaced edges thereof are disposed in relation to one another in such a manner that they are adapted to contact with a non-cylindrical stud at points which are equidistantly spaced from the longitudinal axis of the said stud at a distance corresponding to the diameter of a cylindrical stud, that is at points which are equidistantly spaced from one of the axes of the bounding figure of the transverse cross-section of said non-cylindrical stud.

Having now described my invention, what I claim is:—

1. A safety razor comprising a backing, a razor blade adapted to be held on the backing, said blade having positioning stud receiving apertures, the blade material outlining each aperture including two positioning stud engaging edges opposite each other and side edges, said stud engaging edges being disposed between said side edges and equidistantly spaced from a line parallel with the cutting edge of the blade, said apertures each being elongated at right angles to the cutting edge and transversely of the blade at a side of each of the said positioning stud engaging edges, positioning studs on the backing of a shape complemental to the shape of the aforesaid apertures in the blade, a guard member having spaced holes to receive the positioning studs, and means for retaining the backing, blade and guard in assembled relation to one another.

2. In a safety razor, a backing, a blade having positioning stud receiving apertures, the blade material outlining each aperture having two positioning stud engaging edges opposite each other and equidistantly spaced from a line parallel with the cutting edge of the blade, the said apertures being elongated transversely of the blade on each side of said positioning stud engaging edges, positioning studs on the backing for entering the aforesaid apertures of the blade, said positioning studs having a cross sectional configuration corresponding to the outline of the edges of the apertures in the blade whereby the said positioning studs fit in the apertures of the blade, a guard having apertures to receive the positioning studs, and means for holding the backing, blade and guard in assembled relation to one another.

3. A safety razor blade having positioning stud receiving apertures, the blade material outlining each aperture having two positioning stud engaging edges projecting transversely of the blade toward each other, the said oppositely projecting edges being adapted to engage round positioning studs, and each of the said apertures as a whole being adapted to receive positioning studs of a configuration complemental to the configuration of the apertures.

4. A blade for safety razors provided with stud receiving apertures, the blade material outlining each aperture having two cylindrical-stud engaging projections whose ends are opposite each other, said apertures being elongated transversely of the blade on each side of the said stud engaging ends to receive studs of shapes complemental to the shapes of the apertures.

5. A blade for safety razors provided with positioning stud receiving apertures in line parallel with the cutting edge of the blade, the blade material outlining each aperture having two cylindrical-stud engaging ends projecting transversely of the blade toward each other, said apertures being elongated transversely of the blade on each side of the stud engaging edges to receive positioning studs of shapes complemental to the shapes of the apertures, the elongations of the said apertures in relation to each other as set forth increasing the normal flexibility of the metal blade in the area in lines between and parallel with the outer margins of the apertures in a direction parallel with the cutting edge of the blade.

6. A safety razor blade having positioning stud receiving apertures, the blade material outlining each aperture having two cylindrical-stud engaging projections and side edges, said projections extending transversely of the blade toward each other between said side edges and being equidistantly spaced from a line parallel with the edges of the blade, one of which is the cutting edge, said apertures each being elongated at right angles to the cutting edge and transversely of the blade at a side of each of said stud engaging edges to receive positioning studs of a shape complemental to the shape of the apertures.

7. A safety razor blade having positioning stud receiving apertures, the blade material outlining each aperture having two cylindrical-stud engaging projections and side edges, said projections extending transversely of the blade toward each other between said side edges and being equidistantly spaced from a line parallel with the edges of the blade, one of which is the cutting edge, said apertures each being elongated at right angles to the cutting edge and transversely of the blade at a side of each of said stud engaging edges to receive positioning studs of a shape complemental to the shape of the apertures, the elongations of said apertures in the relation set forth increasing the normal flexibility of the metal blade in the area in lines between and parallel with the outer margins of the apertures, parallel with the cutting edges of the blade.

8. A blade for safety razors provided with a handle-connection receiving aperture and positioning stud receiving apertures on each side thereof and alining therewith, the blade material outlining each of the last mentioned apertures having two cylindrical-stud engaging projections extending transversely of the blade toward each other, said apertures being elongated transversely of the blade on each side of a stud engaging projection to receive a positioning stud of a shape complemental to the shape of the apertures.

9. A safety razor blade having spaced positioning stud receiving apertures, the blade material outlining each aperture including spaced oppositely projecting edges and oppositely located recesses, said edges adapted to engage cylindrical positioning studs, the apertures being adapted to receive portions of non-cylindrical positioning studs between said edges and each of said recesses adapted to receive a portion of a non-cylindrical stud.

10. A safety razor blade for use with cylindrical or non-cylindrical positioning studs, said blade having spaced positioning stud receiving apertures, the blade material outlining each aperture having oppositely projecting edges adapting the aperture to engage a cylindrical positioning stud or a portion of a non-cylindrical positioning stud.

11. A blade for safety razors for use with cylindrical or non-cylindrical positioning studs, said blade being provided with non-circular positioning stud receiving apertures, the blade material outlining each aperture having two oppositely extending stud engaging edges, and each aperture being elongated to receive a positioning stud having a transverse cross-section one dimension of which is larger than that of the diameter of a cylindrical positioning stud adapted to be engaged by said edges.

12. A blade for safety razors provided with positioning stud receiving apertures, the blade material outlining each aperture having two oppositely extending sections with positioning stud engaging edges and each aperture having an area larger than that of a portion of a positioning stud engageable by the stud engaging sections and adapted to receive portions of said positioning stud not engaged by said sections.

13. A safety razor including a blade holder, two spaced blade positioning studs on said holder, the transverse cross-section of each stud being non-circular and its bounding figure being of a configuration that a circle is adapted to be inscribed therein, and a blade having spaced positioning stud receiving apertures, the blade material outlining each of said apertures having spaced oppositely projecting edges adapted to contact with the respective positioning stud or with a cylindrical positioning stud at points at which the said inscribed circle contacts with the bounding figure of the transverse cross-section of said non-cylindrical positioning stud.

14. A safety razor including a blade holder, two spaced non-cylindrical blade positioning studs on said holder, and a blade having spaced positioning stud receiving apertures, the blade material outlining each of said apertures having oppositely projecting spaced edges adapted to contact with its respective positioning stud or with a cylindrical positioning stud at points which are equidistantly spaced from the longitudinal axis of said non-cylindrical positioning stud.

15. A safety razor including a blade holder, two spaced non-cylindrical blade positioning studs on said holder, and a blade having spaced positioning stud receiving apertures, the blade material outlining each of said apertures having oppositely projecting spaced edges adapted to contact with its respective positioning stud or with a cylindrical stud at points which are equidistantly spaced from one of the axes of the transverse cross-section of said non-cylindrical positioning stud.

16. A razor blade having a plurality of apertured portions, said portions adapted to receive positioning studs of varying outline, projections on said blade extending from said blade into said apertures, said projections having opposed ends, said ends adapted to engage a positioning stud, each of said apertured portions having recesses at the sides of the projections, said recesses adapted to receive one or more portions of non-cylindrical studs whereby said apertured portions are adapted to engage opposed portions of studs and thereby prevent shifting of the blade relative to the studs.

17. A razor blade having a central apertured portion and an end apertured portion, said end portion adapted to receive a positioning stud which may be of varying contour or outline, projections on said end portion extending therefrom into the aperture thereof, said projections having opposed ends, said ends adapted to engage a stud, said blade also having recesses at the sides of said projections, said recesses adapted to receive one or more portions of a non-cylindrical stud, whereby said apertured portion is adapted to engage opposed portions of said stud and thereby prevent shifting of the blade relative to the stud.

18. A safety razor blade having a clamping-screw receiving hole and a positioning stud receiving aperture, the blade material outlining said aperture including spaced oppositely projecting edges and oppositely located recesses, said edges adapted to engage a cylindrical positioning stud, the aperture being adapted to receive a portion of a non-cylindrical positioning stud between said edges and each of said recesses adapted to receive a portion of a non-cylindrical stud.

19. A safety razor blade having positioning stud receiving apertures, the blade material outlining each aperture including regularly spaced projecting edges and regularly spaced recesses, said edges adapted to engage cylindrical studs, and thereby prevent shifting of said blade with reference to said studs, said recesses adapted to receive one or more portions of non-cylindrical studs.

20. A safety razor blade having positioning stud receiving apertures, the blade material outlining each aperture including spaced projecting edges and spaced recesses, said edges adapted to engage cylindrical studs, and thereby prevent shifting of said blade with reference to said studs, said recesses adapted to receive one or more portions of non-cylindrical studs.

21. A saftey razor blade having a clamping-screw receiving hole and a positioning stud receiving aperture, the blade material outlining said aperture including regularly spaced projecting edges and regularly spaced recesses, said aperture adapted to engage a cylindrical stud or a non-cylindrical stud, and thereby prevent shifting of said blade with reference to said stud, said recesses adapted to receive one or more portions of said non-cylindrical stud.

22. A safety razor blade having a clamping-screw receiving hole and a positioning stud receiving aperture, the blade material outlining said aperture including spaced projecting edges and spaced recesses, said aperture adapted to engage a cylindrical stud or a non-cylindrical stud, and thereby prevent shifting of said blade with reference to said stud, said recesses adapted to receive one or more portions of said non-cylindrical stud.

23. A safety razor blade having a clamping-screw receiving hole and a positioning stud receiving aperture, the blade material outlining said aperture including opposed sets of diverging edges and spaced recesses, said aperture adapted to engage a cylindrical stud or a non-cylindrical stud, and thereby prevent shifting of said blade with reference to said stud, said recesses adapted to receive one or more portions of said non-cylindrical stud.

Signed at New York, in the county of New York and State of New York, this 18th day of November, 1929.

HENRY J. GAISMAN.